(12) United States Patent
Cohen et al.

(10) Patent No.: US 6,385,308 B1
(45) Date of Patent: May 7, 2002

(54) TELEPHONE SYSTEM AND METHOD FOR PERSONALIZED ANNOUNCEMENTS

(75) Inventors: Steven L. Cohen, Summit; Michael Davitt, Berkley Heights; A. Helen McGrath, Summit; Ronald Nemeth, Bridgewater, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,670

(22) Filed: Dec. 1, 1997

(51) Int. Cl.$^7$ .......................... H04M 1/64; H04M 3/42; H04M 7/00
(52) U.S. Cl. ...................... 379/88.23; 379/67.1; 379/76; 379/209; 379/221
(58) Field of Search .......................... 379/67.1, 68, 76, 379/88.08, 88.11, 88.12, 88.13, 88.22, 201, 202, 210, 212, 142, 221, 40, 69, 70, 72, 82, 85, 88.03, 88.23, 209, 350, 352

(56) References Cited

U.S. PATENT DOCUMENTS

| | | | |
|---|---|---|---|
| 4,811,382 A | | 3/1989 | Sleevi .......................... 379/67 |
| 4,850,007 A | | 7/1989 | Marino et al. ................. 379/67 |
| 5,007,076 A | * | 4/1991 | Blakely ........................ 379/67 |
| 5,007,077 A | * | 4/1991 | Fields et al. ................... 379/67 |
| 5,210,789 A | * | 5/1993 | Jeffus et al. .................. 379/127 |
| 5,276,731 A | * | 1/1994 | Arbel et al. .................... 379/88 |
| 5,305,195 A | * | 4/1994 | Murphy ....................... 364/401 |
| 5,321,740 A | | 6/1994 | Gregorek et al. .............. 379/96 |
| 5,333,186 A | | 7/1994 | Gupta .......................... 379/201 |
| 5,394,445 A | * | 2/1995 | Ball et al. ..................... 379/67 |
| 5,434,908 A | * | 7/1995 | Klein ........................... 379/88 |
| 5,448,625 A | | 9/1995 | Lederman .................... 379/164 |
| 5,479,411 A | * | 12/1995 | Klein ....................... 370/110.1 |
| 5,481,594 A | * | 1/1996 | Shen et al. ................. 379/67.1 |
| 5,600,710 A | | 2/1997 | Weisser, Jr. et al. .......... 379/67 |
| 5,652,784 A | | 7/1997 | Blen et al. .................... 379/67 |
| 5,727,047 A | * | 3/1998 | Bentley et al. ............... 379/93 |
| 5,729,592 A | * | 3/1998 | Frech et al. .................. 379/67 |
| 5,978,451 A | * | 11/1999 | Swan et al. .............. 379/88.24 |

* cited by examiner

Primary Examiner—Fan Tsang
Assistant Examiner—Allan Hoosain

(57) ABSTRACT

A telephone system provides personalized announcements to calling parties in support of branded products and services of the system and others during call processing to called parties. A processor coupled to the system includes a database of designated calling parties receiving personal announcements. Record means stored in the processor for each designated calling party define the parameters for each personalized announcement. Call processing means responsive to the processor initiate a call from the calling party to a called party according to the parameters for the calling party defined in the record means. In one form, audio means under control of the processor play the personalized announcement to the calling party during the pre-answer period of the call or until the call is abandoned or the line is busy.

14 Claims, 3 Drawing Sheets

CLD ADJUNCT-BASED

FIG. 2

TABLE ONE CELL PARAMETERS

CELL 001-300 — 30

| ROW 32 | ANNOUNCEMENT # 34 | DAILY COUNTER 36 | TIC CALL FLOW BIT 38 | CALL FLOW BIT 38 | ENABLE DATE 40 | CALL TYPE 42 | CELL ROW COUNTER 44 | APPLICABLE REGION 46 | EXPIRATION DATE 48 |
|---|---|---|---|---|---|---|---|---|---|
| 1 | 000 | 0-254 OR INFINITY =255 | TIC, PA, OR TICPA | PD OR PT | mm/dd/yyyy | D, I OR ID | 0-254 OR INFINITY =255 | 6 PA REF #'S, 6 NPA'S OR ALL OR DIAMOND REF # | mm/dd/yyyy |
| 2 | " " | | | | | | | | |
| 3 | | | | | | | | | |
| 4 | | | | | | | | | |
| 5 | | | | | | | | | |
| 6 | | | | | | | | | |
| DEFAULT | — | | TICPA | PD | | ID | — | ALL | |

| CELL 001-300 | | TABLE TWO ANI PARAMETERS 54 | 56 |
|---|---|---|---|
| 52 | ROW | ANI COUNTER | DAILY COUNTER |
| ANI NPA NXX XXXX | 1 | 0-254 OR INFINITY=255 | 0-254 OR INFINITY=255 |
| | 2 | | |
| | 3 | | |
| | 4 | | |
| | 5 | | |
| | 6 | | |

TELEPHONE SYSTEM AND METHOD FOR PERSONALIZED ANNOUNCEMENTS

RELATED APPLICATION

Application entitled "Method and Apparatus for Providing Information Messages Within A Communications Network", Ser. No. 08/856,068, filed May 14, 1997, (Peterson 1) now abandoned and assigned to the same assignee as that of the present invention.

BACKGROUND OF THE INVENTION

1. Field of the Invention

This invention relates to telecommunication systems. More particularly, the invention relates to a telephone system facilitating personalized announcements during the pre-answer period of a telephone call.

2. Description of Prior Art

Personalized announcements in a telephone system in support of company branded services, products and information enable customers to have the benefit of promotional offers of the company or others; anticipated service features or changes; assurance of company service as provider and to be more in touch with the company for a better customer-company relationship. Personalized announcements should be limited in number, repetition, time, and in some cases, geography to prevent customer aggravation and loss of harmony in the customer-company relationship. From an operating standpoint, installation of personalized announcements in the system should be compatible with system hardware and software, flexible to changes, reliable and not unduly delay call flow.

Prior art related to telephone systems incorporating messages accompanying call flow is as follows:

U.S. Pat. No. 4,811,382, issued Mar. 7, 1989, discloses a typical telecommunications system for applying messages or data to a customer line of calling parties during the "ring back" period of telephone call set-up. The messages are preferably applied between successive "ring back" tones during the "ring back" period, and then terminated when the called party answers the call. Advertising messages, civic or company announcements, political messages, informational messages or other data can be transmitted on the telephone line during what is otherwise essentially an unused time when the line is already tied up.

U.S. Pat. No. 4,850,007 issued Jul. 18, 1989, discloses a telephone system for providing economical telephone toll service in which a telephone customer selects the economical service by sending an appropriate signal and then dialing his Directory Assistance call or other telephone toll call. The caller's options are determined by the system and typically before signalling for the call is commenced, a recorded announcement of an oral or visual nature is connected to the customer line. The announcement consists of at least one advertisement. After the advertising announcement is completed, the toll car and/or Directory Assistance call is processed as usual but at a reduced rate charged or with automatic credit being given to the customer account for receiving the advertisement.

U.S. Pat. No. 5,321,740 issued Jun. 14, 1994, discloses a telephone marketing system. A calling party places a telephone call to a second party and a switch associated with the network signalling system determines the "busy/idle" status of the called parties. In place of the usual "ring back" or "busy" signal, an announcement indicates to the calling party the status of the second telephone and a series of announcements are played for a predetermined period of time. During the announcements, the system continues to determine the status of the telephone line of the called party. The announcements are played until the call is completed or abandoned.

U.S. Pat. No. 5,448,625 issued Sep. 5, 1995, discloses a method and apparatus for routing a telephone call through a telephone network from a caller to a called party via an advertising service apparatus that operates in two modes successively. In one mode, the parties are in communication with each other and ads are selected from storage during that mode, the ads being impressed on one or both of the parties during a different mode. The modes may alternate between message intervals whose durations are determined by ad message length and communication intervals whose length is determined by a "talking time" timer.

U.S. Pat. No. 5,600,710 issued Feb. 4, 1997, discloses a method for playing a recorded message to a caller when a called line is busy without actual connection of a call. The call is placed in a queue during the "busy" period. The call is then connected to an intelligent peripheral such as a service node that plays a recorded message of the called party's choice. When the called party line becomes idle, the call chosen from the established queue is then connected to it based upon a prioritization system established by the called party.

U.S. Pat. No. 5,652,784 issued Jul. 29, 1997, discloses a telephone advertising service which provides a short advertising message as a telephone call is initiated. The advertising message is stopped after a predetermined run time and an invitation to dial tone is added. The advertising message is stopped when the customer starts to dial a number. The method provides the advertising messages in lieu of invitation to dial tones. Differentiated customers are individually provided with distinct advertising messages. Customers are distinguished by characteristics of exchange numbers, monthly call volume, call type, geographical location, and time of day.

U.S. Pat. No. 5,333,186 issued Jul. 26, 1994, discloses a sponsored-call service feature which enables callers to obtain network-provided telephone services, toll free or at a subsidized rate. The sponsored service permits a third party sponsor to convey commercial messages to and interact with a caller prior to the caller's access to the network's services. After the callers interaction with the sponsor, the network gives the caller a sponsored-specified restricted access to the network provided services.

None of the prior art discloses a telephone system and method for selectively transmitting personalized announcements to a calling party during the pre-answer period after determining the type of announcement and call set up are appropriate and that the announcement has not reached a daily or total announcement limit for the calling party while enabling the announcement to be terminated by the calling party at any time or if the telephone line is busy or otherwise inoperative.

SUMMARY OF THE INVENTION

A system and method provide Personalized Announcements (PAs) during post dial delay of domestic and/or international calls to customers provisioned to receive such announcements through an adjunct processor to a network switch using the customer's Automatic Number Identification (ANI). The PAs may be informational, promotional or service announcements. Each provisioned ANI is associated with a cell stored in the adjunct processor, the cell containing a number of parameters defining call processing for PAs in tabular form. The cell parameters for each PA includes announcement number; daily announcement counter; call flow bits; enable date; call type; cell row counter; applicable region, and expiration date, etc. The call flow bit is of two types. A PD call flow bit plays the PA during the time the adjunct processor tries to complete the call and before the call is answered. A PT call flow bit plays the PA during post dial delay and timed delay of the call. Each ANI includes parameters associated with its assigned cell. The ANI parameters include a an ANI counter and a Daily counter. The ANI counter determines when the cell row counter has maxed out and the PA should no longer be played to the customer. The Daily counter determines when the PA has reached the daily limit and should not be further played for that day. When a provisioned customer originates a call, an originating switch queries a Universal Subscriber Data Structure (USDS) which determines if the call requires processing by the adjunct processor, and if so, routes the call to the adjunct. Based on the ANI, ANI counter, etc., the adjunct determines if the call is PA eligible from the PAs listed in the ANI cell. If eligible and the call bit is set to PD, the adjunct sets up the called leg to the dialed number and then plays the PA during the post dial delay and pre-answer. If the flow call bit is set to PT, the adjunct sets and activates a timer before playing the PA and sets up the outgoing calling leg to the dialed number. If at any time during the call processing the call is answered or the customer presses the # button, the adjunct stops the PA and merges the calling and called legs, after which the adjunct updates the cell counters.

DESCRIPTION OF THE DRAWINGS

The invention will be further understood from the following description of preferred embodiment taken in conjunction the appended drawing which:

FIG. 2 is a cell in a first table stored in the system of FIG. 1 listing each telephone number as a cell and defining parameters for playing personalized announcement to calling party associated with the cell.

DESCRIPTION OF PREFERRED EMBODIMENT

Figure 1:
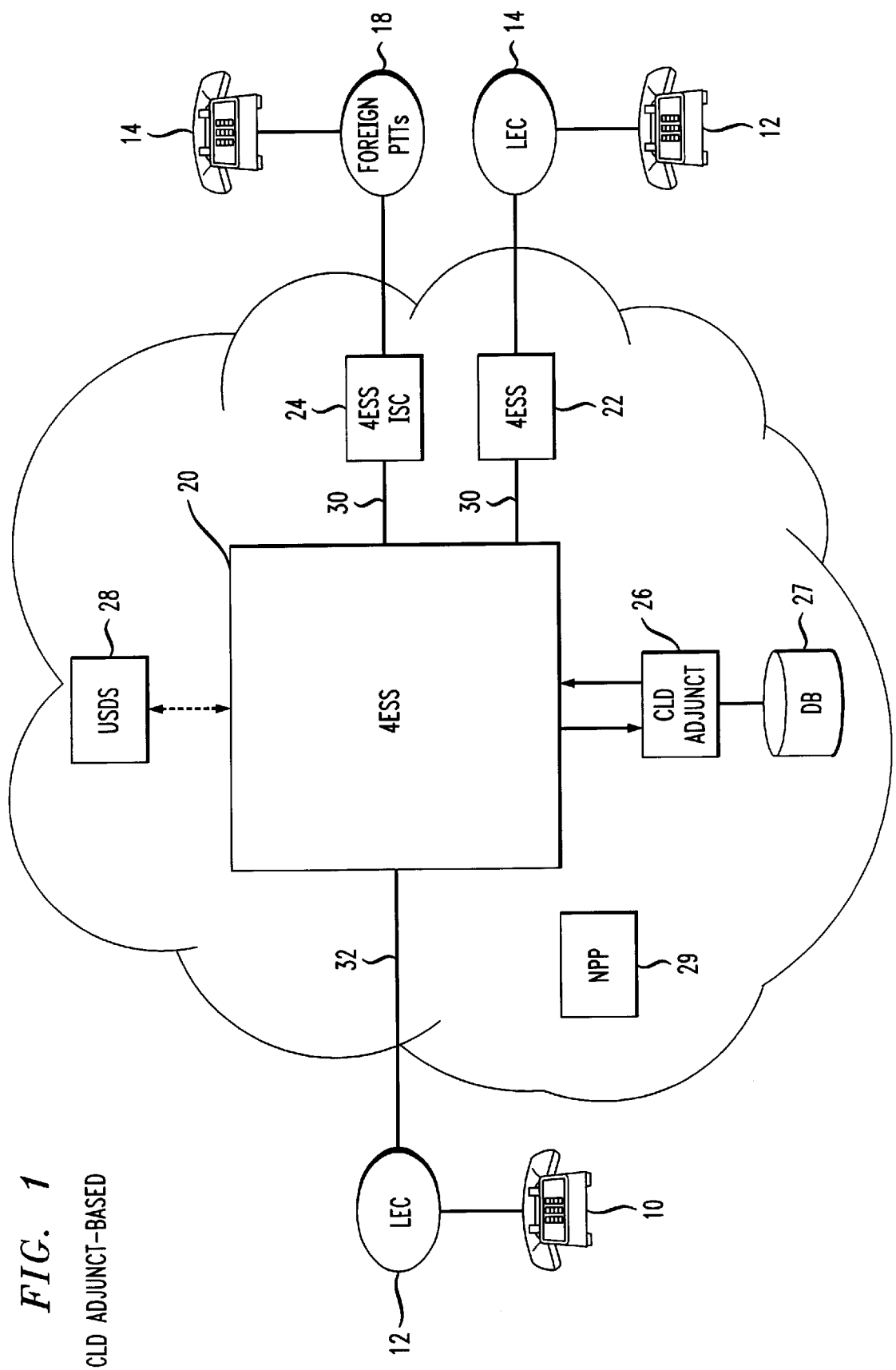
FIG. 1 is a block diagram of a prior art telephone system platform upgraded to provide personal announcements to a calling party in accordance with the principles of the present invention.

In FIG. 1, customers 10, 12, and 14, are coupled to a telecommunications network 16 through Local Exchange Carriers (LEC) 13, 15 in the case of domestic calls and to foreign postal telephone/telegraph exchanges 18 in the case of international calls. The network 16 may be of any type including, for example, a Public Switch Telephone Network (PSTN), the Internet, any combination of the networks, or, for example, the AT&T IXC network. The network 16 includes switching centers 20, 22 and 24, linked together through trunks 30 and further linked to the Local Exchange Carriers (LEC) through trunks 32. Each switching center includes a processor and a computer-readable memory which runs special software to provide customers with special telephone services such as personalized announcements (PAs). The switching centers 20 and the like may be any intelligent switching system, e.g. the 4ESS* switching system manufactured and sold by Lucent Technologies, Inc., 600 Mountain Avenue, Murray Hill, N.J. 07964. The switching centers perform the specialized services in response to instructions from within the switching center or from an outside processor 26 and associated database 27. One example of an outside processor is a Consumer Long Distance (CLD) adjunct processor described in U.S. Pat. No. 5,311,576 entitled "Adjunct Processor Embedded in Switching System", issued May 10, 1994, assigned to the same assignee as that of the present invention which talks to the switch and provides switching commands for call flows for the various special telephone services, e.g. personalized announcement executed by the switching center 20 and the like. In one form, the personal announcement may be an audio message played to the customer through the telephone. In another form, the message may be a video message displayed to the customer on a display of a Personal Computer adapted for telephone service. A universal subscriber data structure 28 is coupled to the switching center and includes data bases containing data for each customer served by the switch 20. Each customer telephone is provided with an Automatic Number Identification (ANI) for recognition purposes by the switching system in providing special services. *4ESS is a trademark of Lucent Technologies, Inc.

Customer data descriptive of parameters for special services, e.g. personalized announcements is inputted to a network provisioning platform 29 which supplies such information to the database 27 for the processor 26. As a part of the provisioning process, an announcement text is also delivered to a customer service representative in video form for customer assistance. Service descriptions for each customer are deployed on an ANI basis and described in a table of cells. The cells are created and generated in the adjunct processor for such service and stored in the database 27 as an announcement table and an ANI table. The processor will enable all customers receiving personalized announcements to receive their announcements according to their cell characteristics. When de-provisioned, a customer will not receive any personalized announcement.

In FIG. 2, a portion of the table for personalized announcements is represented by a cell 30 for an ANI identified in the table by the location numbers 001–300. The processor 26 creates a row in the table for each personalized announcement. Each row includes a description of parameters defining call processing for such personalized announcements. In one embodiment, each cell has 6 rows for 6 personalized announcements, as shown in column 32. An announcement number column 34 is assigned and specified for each personalized announcement in the cell. A number can appear in one cell but a cell may have many numbers. The same number can be used across many cells but has the flexibility to be altered on different types of calls with different types of call flows. Each announcement has an announcement length parameter which is created for length of the pre-answer or Post Dial Delay (PDD) period and stored with the announcement. The parameter is stored in tenths of seconds with a range 0.0–99.9 and a default of 0.0.

A daily counter column 36 is incremented each time a personalized announcement is played to the ANI. When a daily limit is reached, the processor 26 recognizes the limit and the announcement is not played.

A Time In Country (TIC) Call Flow Bit column 37 is used to prioritize TIC and PA announcements. The TIC Call Flow Bit will determine whether PA and/or TIC features apply and in what order. When the call flow bit is set to TIC then a TIC call flow announcement is played without a PA. If the TIC call flow bit is set to PA the PA call flow is followed without a TIC announcement. If the TIC Call Flow bit is set to TICPA then the TIC announcement is played followed by the PA call flow. If the PA counter has reached its limit or the expiration date has passed then despite the TIC call flow indicator the TIC announcement is played.

A call flow bit column 38 indicates whether an announcement will play during call set-up time, or during call set-up time with the call set-up being delayed a specific timed amount in order to take advantage of post-dial delay associated with a terminating number. There are two different call flow bits. The definitions for call flow bits are as follows:

(1) "PD" is defined as playing the announcement during the time the adjunct processor tries to complete the call and before the call is answered. "PD" is a combination of post-dial delay and pre-answer time.

(2) "PT" is defined as playing the announcement during the post-dial delay and timed delay of the call. The time delay is defined as the announcement length minus the post-dial delay of the call termination. The call will reach resolution once the announcement has completed playing.

An enable date column 40 contains a date specifying when a promotional announcement, such as, discount services should start. Should a problem occur in a single cell row, or should a promotion cease on a specified date, the announcement row parameters can be disabled through an expiration date for such calls without affecting other announcements or cell rows.

An announcement type column 42 indicates the type of call to which the announcement applies and contains a descriptor "D" for domestic calls or "I" for international calls.

A cell row counter column 44 counter contains an integer indicating the number of times the announcement for that row will be played to the ANI for that cell. Column 44 is different from column 36, the former limiting the daily playing and the limiting the total playing of the announcement for that row.

An applicable region column 46 contains a limiting descriptor. The caller will receive a message if the digits dialed are applicable to the region described in the column.

Figures 3, 4:
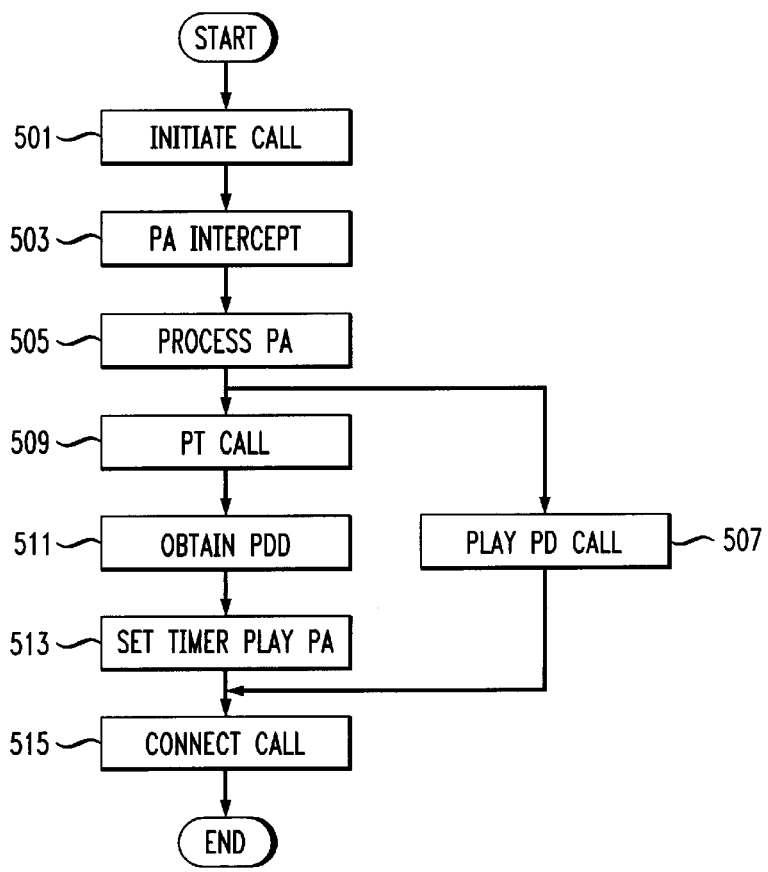
FIG. 3 s a cell in a second table stored in the system of FIG. 1 for a counter associated with an automatic number identification (ANI) of a telephone line for a calling party receiving personalized announcements and recording the daily and total number of announcements played on the telephone line.
FIG. 4 is a flow diagram of call flow in the telephone system of FIG. 1 for providing personalized announcements to a calling party during the pre-answer period of the call.

An expiration date column 48 contains a specified date an announcement should end. Alternatively, should an ANI not place as many calls as required to equal the cell number counter, then the expiration date will indicate the personalized announcement is no longer valid and should not be played. In FIG. 3, a portion of the table for ANI's receiving messages is represented by a cell 50 for locations 001–300. The provisioning accompanying a call populates the ANI table to supplement the announcement table for the same cell location described in conjunction with FIG. 2. The table is stored in the database 27 and is incremented by row according to the announcement played. The cell 50 contains a row column 52 having a number of rows corresponding to the rows contained in the announcements cell 30 described in conjunction with FIG. 2. Each row in the cell 50 is incremented as the announcement for that row is played for the ANI. A column 54 is established and identified as an ANI counter to determine when the ANI has reached the cell row counter number and the personalized announcement should no longer be played to the caller. A column 56 is established and identified as an ANI daily counter to determine when the ANI has reached the cell row daily limit for the announcement to play. As each announcement is played for the ANI at the cell location 001–300, the table is incremented for the ANI Counter and the Daily Counter.

In FIG. 4 a call-flow for a customer with personalized announcements will be described. The process is initiated in a step 501 when a customer initiates a call provisioned for personal announcement service. All calls provisioned for PA's are intercepted in a step 503 and sent to the processor. The switch routes the call to the adjunct processor if a "yes" condition exists. The adjunct processor receives the call from the switch in a step 505. Based on the ANI, terminating number, ANI counter, enabled/disable toggles and expiration date, the adjunct processor determines if the call is personal announcement eligible. If the call is personal announcement eligible, the processor processes the call on the basis of the parameters assigned to the announcement in a row of the cell for the ANI on which the call was initiated. If the call-flow bit is set to "PD" for Post Dial Delay, the processor sets up an out-going calling leg through the switch 20 to the dialed number and then plays the announcement in a step 507. During this call flow the processor 26 utilizes the PDD and pre-answer period to play announcement and then apply other applicable features.

If the call-flow bit is set to "PT" for Post Dial Delay with timer, the processor examines the table for cell corresponding to the ANI, e,g, cell 30 and retrieves the announcement length parameter in a step 509. The processor obtains the PDD for the terminating region of the call in a step 511. The PDD for the terminating region is subtracted from the announcement length and the difference is set in to a timer in a step 513. The processor starts playing the announcement and begins decrementing the counter. When the timer reaches the value calculated in step 513, the processor sets up the out-going call leg to the dialed number. Personalized announcements are only played if the call terminates to a destination consistent with applicable region parameter for the cell associated with the ANI If at any point in any of the call-flow, the call reaches the "answered" state, or the caller presses the "#" sign, the processor stops the announcement and then merges the connection legs in a step 515 after which the process ends.

Each time a personal announcement is played to the ANI, the daily counter is incremented. In the event an announcement does not complete playing, then the daily counter and the ANI counter are not incremented. If the adjunct processor receives an in-band "busy" or a "disconnect" message on the connecting leg during the announcement, and the call-flow bit is "PD" or "PT" then the processor stops playing the announcement, plays an in-band "busy" tone on the connecting leg and applies applicable features.

If the processor receives a "connect" message on the connected leg under call-flows "PD" or "PT", the processor stops playing the announcement, bridges the connecting and connected call legs, and send a "connects" message to the switch 20.

The processor 26 update the ANI parameter table at the beginning of each call. If cell row parameters have been added, then the processor shall apply the new cell row parameters. If the cell row parameters have been deleted, the processor shall delete the ANI counters and not apply the previous cell parameters.

While the invention has been described with respect to a specific embodiment, various features may be modified therein without departing from the spirit and scope of the invention as defined in the appended claims in which:

We claim:

1. A telephone system providing personalized announcements to calling parties during call processing to called parties, comprising:
   a) an adjunct processor means coupled to the system and including a database of designated calling parties for receiving personal announcements;
   b) record means stored in the processor for each designated calling party and defining parameters for each personalized announcement stored;
   c) means defining a call flow bit for each personalized announcement during pre-answer time and post dial delay; and
   d) means for playing a personalized announcement to a calling party during the call flow until the called party answers the call or the call is abandoned.

2. The system of claim 1 further comprising:
   a) means for delivering message text in video form to at least one customer service representative for customer assistance.

3. The system of claim 2 further comprising:
   a) means for determining when an announcement should no longer be played to a designated calling party.

4. The system of claim 2 further comprising:
   a) means for determining when the designated calling party has received a daily limit of personalized announcements.

5. The system of claim 1 further comprising:
   a) means associated with each designated calling party and defining parameters tracking calls including a personalized announcement.

6. The system of claim 1 further comprising:
   a) means for identifying calling parties designated to receive personalized announcements.

7. The system of claim 1 further comprising:
   a) means for terminating the announcement when the call is answered by the called party or the calling party sends a signal to the processor.

8. The system of claim 1 further comprising:
   a) means for determining the maximum number of times an announcement may play on a given day.

9. The system of claim 1 further comprising:
   a) means for determining the number of times an announcement may be played to a designated calling number.

10. The system of claim 1 wherein the designated calling party is identified by an Automatic Number Identification (ANI).

11. A method of delivering specific groups of personalized announcements to calling parties in a telephone system based on different criteria associated with the calling party and the called parties comprising the steps of:
    a) connecting a processor to the system;
    b) storing in the processor a database of the calling parties for receiving personal announcements;
    c) establishing in the database a record for each calling party and defining criteria in the record for each personalized announcement played to the calling party;
    d) identifying calling parties designated to receive personal announcements;
    e) defining a call flow bit for each personalized announcement during pre-answer time and post dial delay;
    f) determining for each call (i) the number of times an announcement may be played to a designated calling number; (ii) when an announcement should no longer be played to a designated calling party; and (iii) when the designated calling party has received the daily limit of personal announcements; and
    g) playing an announcement to a calling party during the call flow until the called party answers the call or the call is abandoned.

12. The method of claim 11 further comprising the steps of:
    a) updating the record in the processor when personal announcements are played to an eligible customer;
    b) updating the record as personal announcements are added or deleted from the system.

13. The method of claim 11 further comprising the steps of:
    a) setting a call flow bit in the record for each announcement, the bit defining a post dial delay period for playing the personal announcement;
    b) incrementing a daily counter in the record for an eligible customer when a personal announcement is played.

14. The method of claim 11 further comprising the steps of:
    a) maintaining an ANI counter record for eligible customer to determine when the ANI has reached a cell row counter number in the record and a personal announcement should no longer be played to the eligible customer;
    b) maintaining a daily ANI counter record to determine when the ANI has reached a cell row daily limit in the record and the announcement should no longer be played.

* * * * *